United States Patent

Beninga et al.

[11] Patent Number: 6,095,672
[45] Date of Patent: Aug. 1, 2000

[54] LIGHTING DEVICE FOR THE REAR END OF A VEHICLE

[75] Inventors: Gerhard Beninga, Walddorfhaeslach; Martin Dziuba, Renningen; Martin Harth, Sindelfingen, all of Germany

[73] Assignee: DaimlerChrysler AG, Stuttgart, Germany

[21] Appl. No.: 09/170,199

[22] Filed: Oct. 13, 1998

[30] Foreign Application Priority Data

Oct. 10, 1997 [DE] Germany ............................ 197 44 715

[51] Int. Cl.⁷ ........................................................ F21S 8/10
[52] U.S. Cl. ........................... 362/545; 362/543; 362/544
[58] Field of Search ................................... 313/498, 500; 362/545, 543, 544, 800

[56] References Cited

U.S. PATENT DOCUMENTS

| | | | |
|---|---|---|---|
| 4,831,503 | 5/1989 | DeSantis et al. | 362/80 |
| 4,929,866 | 5/1990 | Murata et al. | 313/500 |
| 5,567,036 | 10/1996 | Theobald et al. . | |

FOREIGN PATENT DOCUMENTS

| | | |
|---|---|---|
| 40 21 987 C2 | 2/1991 | Germany . |
| 42 24 061 C2 | 1/1994 | Germany . |
| 296 02 186 U1 | 5/1996 | Germany . |
| 195 47 861 A1 | 6/1997 | Germany . |

*Primary Examiner*—Cassandra Spyrou
*Assistant Examiner*—Craig Curtis
*Attorney, Agent, or Firm*—Evenson, McKeown, Edwards & Lenahan, PLLC

[57] ABSTRACT

A lighting device for the rear end of a vehicle which has at least one light chamber in which at least one incandescent lamp is disposed. A main reflector which rearwardly emits light is associated with the incandescent lamp. A transparent covering is used to cover the lighting device. A plurality of light-emitting diodes are disposed in the light chamber. The lighting direction of the light-emitting diodes is aimed at least approximately in the direction of travel against a side reflector which is disposed in the light chamber. As a result, the light rays striking the side reflector are directed outwardly in an approximately transverse direction to the vehicle.

15 Claims, 2 Drawing Sheets

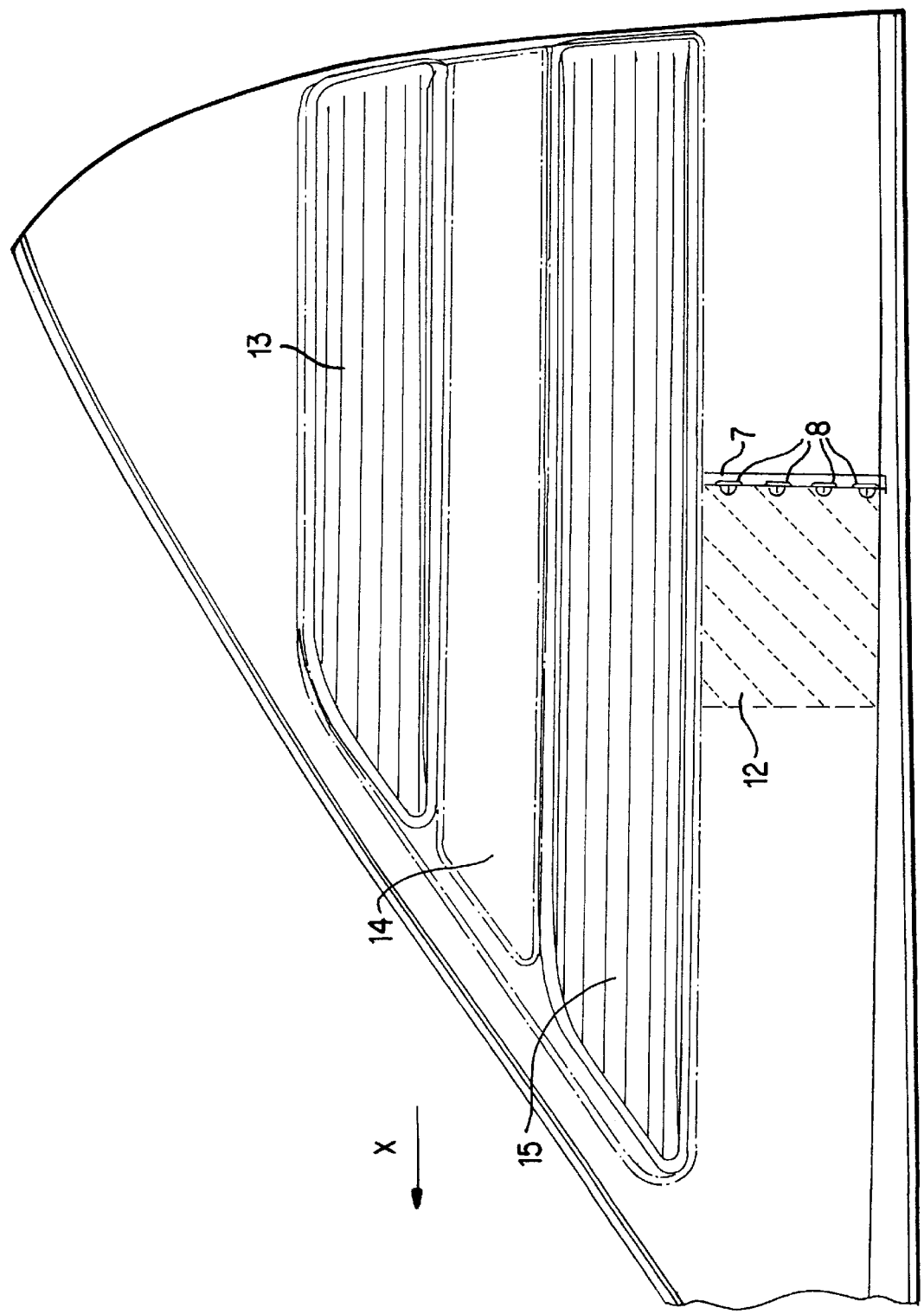

LIGHTING DEVICE FOR THE REAR END OF A VEHICLE

BACKGROUND AND SUMMARY OF THE INVENTION

This application claims the priority of German application number 197 44 715.5, filed Oct. 10, 1997, the disclosure of which is expressly incorporated by reference herein.

The invention relates to a lighting device for the rear end of a vehicle, having at least one light chamber in which at least one incandescent lamp is disposed. A main reflector which emits light substantially rearward is associated with the incandescent lamp. A transparent cover is used to cover the light chamber. The light chamber also has a side light system disposed therein, along with a secondary reflector. Here, the secondary reflector is arranged in the light chamber such that light rays striking it are directed outward at least approximately transversely of the direction of travel of the vehicle.

U.S. Pat. No. 4,831,503 discloses a lighting device of this kind for the rear end of a vehicle, especially a motor vehicle. In a lighting compartment with a transparent cover, in addition to the incandescent bulbs with their rearwardly directed main reflectors, a side light arrangement is provided. This side light system has an incandescent bulb and a secondary reflector which deflects a portion of the light beams from the bulbs transversely across the direction of travel of the vehicle.

German patent document DE 40 21 987 C2 discloses another lighting device which is claimed to have small vertical dimensions and an optimum distribution of light.

In German patent document DE 42 24 061 C2, a vehicle rear light, especially for bicycles, is described. Here, a light-emitting diode is provided as the light source. Since light-emitting diodes naturally possess only a narrow light dispersion angle, the reference claims to achieve a larger, rearwardly directed luminous surface by using a light-scattering belt or a reflector.

In U.S. Pat. No. 5,567,036 a boundary and marker light, especially for truck roof lights, is described. A plurality of light-emitting diodes aimed in different directions serve as the light source. Together with the configuration of the transparent cover over the light-emitting diodes, emittance of light in a dispersion angle of up to 180° is ensured.

German patent document DE 195 47 861 A1 describes a possibility for keeping the space occupied by a lighting device as low as possible. To achieve this, a special light-conducting body is used, which is disposed between any light source and a transparent covering of the lighting device.

German patent document DE 296 02 186 U1 discloses a universal vehicle lighting device, wherein reflector strips and light-emitting diodes, among other things, are provided. However, no information on the configuration and design of this lighting device is included in this disclosure.

It is therefore an object of the present invention to obtain a rearwardly directed illumination and excellent lateral lighting for the tail light of a vehicle, while at the same time keeping the space it occupies and the manufacturing cost as low as possible. Lateral lighting in the form of a side marker light or a side light arrangement is prescribed by law in the U.S.A., for example, and therefore this requirement is to be satisfied by the present invention without great technical cost.

This and other objects and advantages are achieved by the lighting device according to the invention, in which along with the known incandescent lamps whose light output is directed substantially rearward, a side light arrangement is provided with light-emitting diodes that are aimed at least approximately forward. This has the effect of creating lateral lighting. A sufficient lighting effect is achieved due to cooperation with a side reflector by which impinging light rays, which run roughly in the direction of travel, are conducted outwardly at least approximately transversely to the vehicle's direction.

If in this case the direction of emission is directed slightly forward, for example, by about 10 degrees, the side marking light required by law in the U.S.A. is easily obtained.

In a preferred manner, the lighting device according to the invention is used for the vehicle's tail light operation. Of course, however, it can also be used in the same manner for the brake lights and the turning indicators.

In an advantageous embodiment of the invention, a very good and uniform lateral emission of the light produced by the light-emitting diodes can be achieved if the side reflector is provided with steps such that the light rays produced by the light-emitting diodes emanate from the transparent cover at least approximately parallel to one another over an area based on the reflector size and the number of light-emitting diodes.

Other objects, advantages and novel features of the present invention will become apparent from the following detailed description of the invention when considered in conjunction with the accompanying drawings.

BRIEF DESCRIPTION OF THE DRAWINGS

FIG. 2 shows a side view of the lighting device.

DETAILED DESCRIPTION OF THE DRAWINGS

Figure 1:
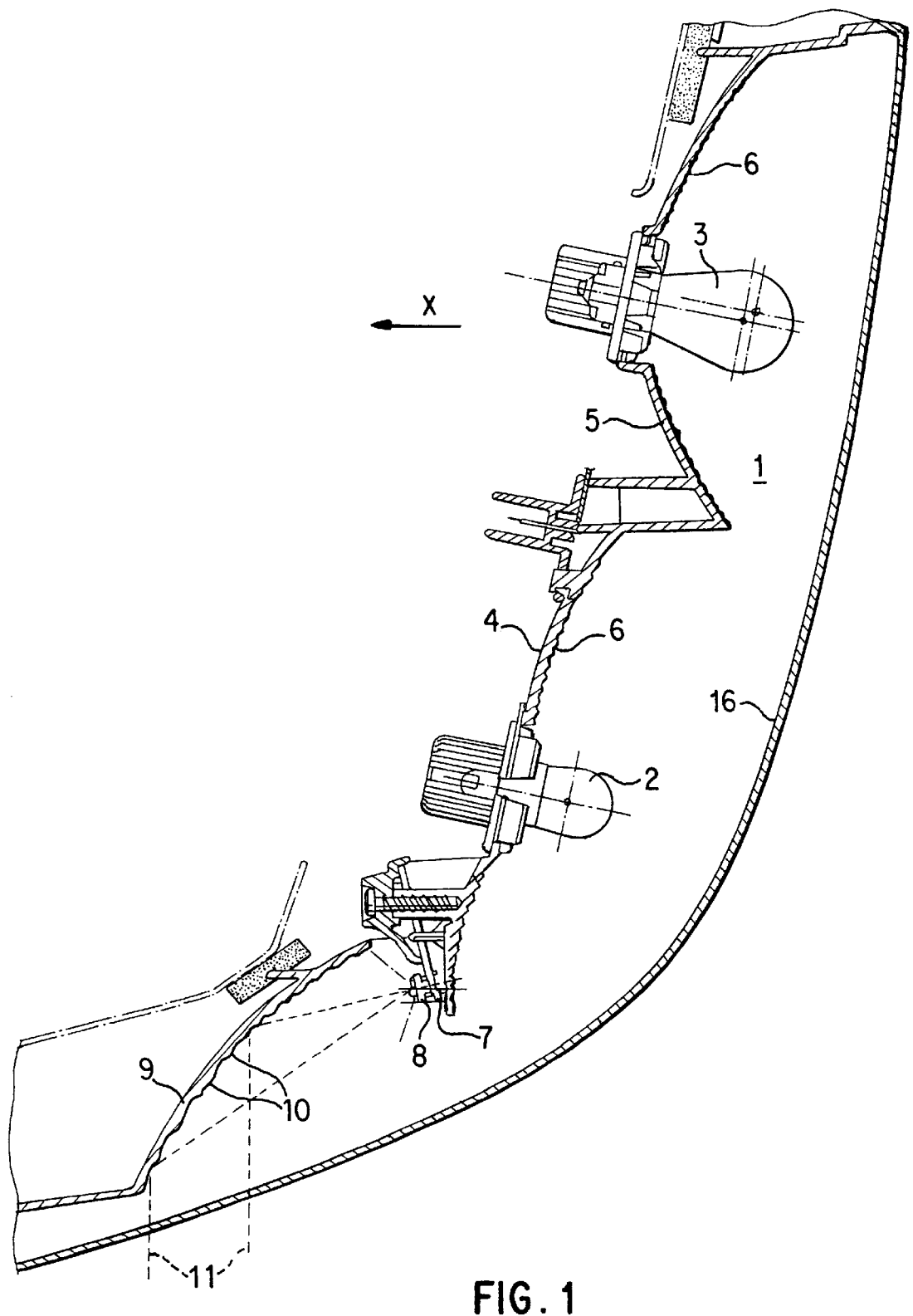
FIG. 1 shows a horizontal section through the lighting device of the invention.

A lighting device for the rear end of a vehicle has a light chamber 1 with a side light arrangement, where two incandescent lamps 2 and 3 having a tail-light function are inserted in one wall of the light chamber. The larger of the two incandescent lamps is, in a known manner, in the form of a two-filament lamp. Here, one filament forms the tail light and the second filament forms the fog tail light.

The two incandescent lamps (bulbs) 2 and 3 are each provided with a main reflector 4 and 5. Here, each reflector is provided with gradations 6 by which a lateral scattering next to a rearwardly aimed light is achieved. As a result, light radiation through a translucent rear cover 16 with an at least largely uniform brightness is achieved.

A plate 7 is arranged alongside the light bulb 2. This plate 7 is situated laterally outside the bulb 2 with respect of the vehicle. The plane of the plate 7 is angled slightly in the vertical direction toward the transverse direction of the vehicle. The angle is selected so that the plane of the plate is turned slightly outward. Several light-emitting diodes 8 are arranged vertically one over the other in the plate 7 as the main piece of the side light system. The number of light-emitting diodes 8 depends on the size of the desired lighted area and the size and structure of the light chamber 1. Thus, for example, four light-emitting diodes can be arranged one above the other, and in some cases two or more rows can be arranged side by side. The light-emitting diodes 8 are arranged in the plate 7 and the plate 7 is positioned such that light rays 11 from the light-emitting diodes are directed forward in the direction of travel X (see arrow) at a slightly outward angle.

Arranged in front of the light-emitting diodes 8 is a side reflector 9, which is provided with steps 10 in the reflector surface, such that the light rays 11 emitted from the light-emitting diodes and striking the side reflector 9 are aimed parallel and laterally out of the transparent cover 16.

In the exemplary embodiment according to the invention, the light rays emanate laterally and perpendicularly to the direction of travel. If desired, with a slight modification of the position of the plate 7 and/or of the side reflector 9, radiation aimed slightly forward can also be achieved. This will enable the satisfaction of the legal requirements for a side marker light in the USA.

Depending on the number and arrangement of the Light-emitting diodes 8, the result is thus an appropriately large illuminated lateral surface 12. In FIG. 2, the illuminated side surface 12 is indicated by broken lines.

In FIG. 2, above the light chamber 1 for the tail light function and the illuminated lateral surface 12, three more window areas 13, 14 and 15 are provided for the turn indicator light, the backup light and the brake light.

Since the operation of a lighting apparatus with the incandescent bulbs 2 and 3 is generally known, it will not be further discussed at this point. The power supply for the light-emitting diodes 8 and the plate 7 can be provided (in a manner not shown) through the same wiring as the bulbs 2 and 3 or by a lateral wire running from the bulb 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lighting device for the rear end of a vehicle, comprising:
    at least one light chamber;
    at least one incandescent lamp disposed in the at least one light chamber and oriented in a first approximately rearward direction with respect to the vehicle;
    a main reflector associated with the at least one incandescent lamp for reflecting light substantially rearward with respect to the vehicle;
    a transparent covering disposed on the at least one light chamber;
    a side light system and a secondary reflector disposed in the light chamber, the secondary reflector being arranged in the at least one light chamber such that light rays striking it are directed outwardly at least approximately transversely to a direction of travel of the vehicle;
    wherein the side light system has a plurality of light-emitting diodes oriented in a second approximately forward direction with respect to the vehicle such that light rays from the plurality of diodes are directed forward approximately in the direction of travel against the secondary reflector.

2. The lighting device according to claim 1, wherein the outwardly directed light rays are forwardly directed with respect to the vehicle at an angle up to approximately 10°.

3. The lighting device according to claim 1, wherein the plurality of light-emitting diodes are disposed at least in an approximately vertical manner.

4. The lighting device according to claim 2, wherein the plurality of light-emitting diodes are disposed at least in an approximately vertical manner.

5. The lighting device according to claim 1, wherein the light-emitting diodes are disposed on a common plate, the plane of the plate being at a slight angle with respect to a transverse direction of the vehicle.

6. The lighting device according to claim 2, wherein the light-emitting diodes are disposed on a common plate, the plane of the plate being at a slight angle with respect to a transverse direction of the vehicle.

7. The lighting device according to claim 3, wherein the light-emitting diodes are disposed on a common plate, the plane of the plate being at a slight angle with respect to a transverse direction of the vehicle.

8. The lighting device according to claim 1, wherein the secondary reflector has gradations in the reflector surface such that the light rays of the light-emitting diodes emanate at least in an approximately parallel manner.

9. The lighting device according to claim 2, wherein the secondary reflector has gradations in a reflector surface such that the light rays of the light-emitting diodes emanate at least in an approximately parallel manner.

10. The lighting device according to claim 3, wherein the secondary reflector has gradations in a reflector surface such that the light rays of the light-emitting diodes emanate at least in an approximately parallel manner.

11. The lighting device according to claim 4, wherein the secondary reflector has gradations in a reflector surface such that the light rays of the light-emitting diodes emanate at least in an approximately parallel manner.

12. The lighting device according to claim 5, wherein the secondary reflector has gradations in a reflector surface such that the light rays of the light-emitting diodes emanate at least in an approximately parallel manner.

13. A lighting device for the rear end of a vehicle, comprising:
    at least one light chamber;
    at least one incandescent lamp disposed in the at least one light chamber and oriented in a first direction substantially rearward with respect to the vehicle;
    a main reflector associated with the at least one incandescent lamp for reflecting light substantially rearward with respect to the vehicle;
    a transparent covering disposed on the at least one light chamber;
    a side light system disposed in the light chamber, the side light system comprising a side reflector and a plurality of light-emitting diodes aimed in a second direction substantially opposite the first direction to direct light against the side reflector at least approximately in a forward direction of travel of the vehicle.

14. The lighting device according to claim 1, wherein the secondary reflector is arranged forward of the main reflector with respect to the direction of travel of the vehicle.

15. The lighting device according to claim 13, wherein the side reflector is arranged forward of the main reflector with respect to the direction of travel of the vehicle.

* * * * *